US011021404B2

(12) United States Patent
Schwartz et al.

(10) Patent No.: US 11,021,404 B2
(45) Date of Patent: Jun. 1, 2021

(54) CERAMIC-POLYMER COMPOSITES OBTAINED BY COLD SINTERING PROCESS USING A REACTIVE MONOMER APPROACH

(71) Applicant: SHPP Global Technologies B.V., Bergen op Zoom (NL)

(72) Inventors: Erik Schwartz, Bergen op Zoom (NL); Thomas L. Evans, Mount Vernon, IN (US); Theodorus Hoeks, Bergen op Zoom (NL); Robert Dirk Van De Grampel, Tholen (NL); Chiel Albertus Leenders, Fijnaart (NL); Mark John Armstrong, Bergen op Zoom (NL)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 16/327,635

(22) PCT Filed: Aug. 25, 2017

(86) PCT No.: PCT/US2017/048713
§ 371 (c)(1),
(2) Date: Feb. 22, 2019

(87) PCT Pub. No.: WO2018/039619
PCT Pub. Date: Mar. 1, 2018

(65) Prior Publication Data
US 2019/0225549 A1 Jul. 25, 2019

Related U.S. Application Data

(60) Provisional application No. 62/379,855, filed on Aug. 26, 2016.

(51) Int. Cl.
| | | |
|---|---|---|
| *C04B 35/634* | (2006.01) | |
| *C04B 41/83* | (2006.01) | |
| *C04B 35/453* | (2006.01) | |
| *C04B 35/488* | (2006.01) | |
| *C04B 35/495* | (2006.01) | |
| *C04B 35/626* | (2006.01) | |
| *C04B 41/48* | (2006.01) | |
| *C04B 41/00* | (2006.01) | |
| *C04B 35/645* | (2006.01) | |
| *C04B 35/486* | (2006.01) | |
| *C04B 35/447* | (2006.01) | |
| *C04B 35/553* | (2006.01) | |
| *C04B 35/515* | (2006.01) | |

(52) U.S. Cl.
CPC .......... *C04B 35/634* (2013.01); *C04B 35/447* (2013.01); *C04B 35/453* (2013.01); *C04B 35/486* (2013.01); *C04B 35/488* (2013.01); *C04B 35/495* (2013.01); *C04B 35/5152* (2013.01); *C04B 35/553* (2013.01); *C04B 35/6263* (2013.01); *C04B 35/6264* (2013.01); *C04B 35/6269* (2013.01); *C04B 35/62685* (2013.01); *C04B 35/645* (2013.01); *C04B 41/009* (2013.01); *C04B 41/48* (2013.01); *C04B 41/83* (2013.01); C04B 2235/3201 (2013.01); C04B 2235/3203 (2013.01); C04B 2235/3206 (2013.01); C04B 2235/3215 (2013.01); C04B 2235/3229 (2013.01); C04B 2235/3232 (2013.01); C04B 2235/3239 (2013.01); C04B 2235/3256 (2013.01); C04B 2235/3272 (2013.01); C04B 2235/442 (2013.01); C04B 2235/444 (2013.01); C04B 2235/448 (2013.01); C04B 2235/5436 (2013.01); C04B 2235/5445 (2013.01); C04B 2235/5481 (2013.01); C04B 2235/604 (2013.01); C04B 2235/616 (2013.01); C04B 2235/656 (2013.01); C04B 2235/6588 (2013.01); C04B 2235/662 (2013.01); C04B 2235/77 (2013.01); C04B 2235/9607 (2013.01)

(58) Field of Classification Search
CPC . C04B 35/634; C04B 2235/604; C04B 41/48; C04B 35/488; C04B 35/6263; C04B 35/6269; C04B 41/009; C04B 35/453; C04B 35/495; C04B 35/6264; C04B 2235/3201; C04B 2235/3206; C04B 2235/3215; C04B 2235/3272; C04B 2235/3232; C04B 2235/3239; C04B 2235/3229; C04B 2235/662; C04B 2235/9607; C04B 2235/77; C04B 41/83
USPC ........................................................ 524/406
See application file for complete search history.

(56) References Cited

U.S. PATENT DOCUMENTS

| | | | | |
|---|---|---|---|---|
| 2002/0014182 | A1* | 2/2002 | Yadav | ...................... H01G 4/12 106/400 |
| 2004/0043051 | A1* | 3/2004 | Pilliar | ...................... A61L 27/12 424/423 |
| 2014/0295057 | A1 | 10/2014 | Ryabova | |

FOREIGN PATENT DOCUMENTS

| | | |
|---|---|---|
| TW | 201823184 A | 7/2018 |
| WO | WO-2018039619 A1 | 3/2018 |

OTHER PUBLICATIONS

Guo et al., Adv. Funct. Mater., 26, 7115-7121, 2016. (Year: 2016).*

(Continued)

*Primary Examiner* — Hui H Chin
(74) *Attorney, Agent, or Firm* — Norton Rose Fulbright US LLP

(57) ABSTRACT

Described herein are cold-sintered ceramic polymer composites and processes for making them from ceramic precursor materials and monomers and/or oligomers. The cold sintering process and wide variety of monomers permit the incorporation of diverse polymeric materials into the ceramic.

19 Claims, No Drawings

(56) References Cited

OTHER PUBLICATIONS

Guo et al., Angew. Chem. Int. Ed., 55, 11457-11461, 2016. (Year: 2016).*

"Infrared and thermogravimetric study of high pressure consolidation in alkoxide silica gel powders", Journal of Non-Crystalline Solids North-Holland Physics Publishing Amsterdam NL vol. 220, No. 2-3, (Nov. 1, 1997), 195-201.

"International Application Serial No. PCT/US2017/048713, International Search Report dated Nov. 8, 2017", 6 pgs.

"International Application Serial No. PCT/US2017/048713, Written Opinion dated Nov. 8, 2017", 10 pgs.

Jing, Guo, et al., "Cold Sintering Process of Composites Bridging the Processing Temperature Gap of Ceramic and Polymer Materials", Advanced Functional Materials vol. 26 No. 39, (Aug. 18, 2016), 7115-7121.

Jing, Guo, et al., "Cold Sintering: A Paradigm Shift for Processing and Integration of Ceramics", (Aug. 11, 2016).

Jing, Guo, et al., "Supporting Information: Cold Sintering Process of Composites Bridging the Processing Temperature Gap of Ceramic and Polymer Materials", Advanced Functional Materials vol. 26 No. 39, (Aug. 18, 2016), 7115-7121.

* cited by examiner

CERAMIC-POLYMER COMPOSITES OBTAINED BY COLD SINTERING PROCESS USING A REACTIVE MONOMER APPROACH

This application is a U.S. National Stage under 35 U.S.C. 371 of International Application No. PCT/US2017/048713, filed on Aug. 25, 2017, and published as WO 2018/039619 on Mar. 1, 2018, which application claims the benefit of priority to U.S. Provisional Patent Application No. 62/379, 855, filed on Aug. 26, 2016, which applications are incorporated in their entirety as if fully set forth herein.

BACKGROUND

Many ceramic and composite materials are sintered to reduce porosity and to enhance properties of the materials such as strength, electrical conductivity, translucency and thermal conductivity. Sintering processes involve the application of high temperatures, typically above 1,000° C., to densify and to improve the properties of the materials. However, the use of high sintering temperatures precludes the fabrication of certain types of materials and it increases the expense of fabricating the materials.

Certain low temperature processes for sintering ceramics can address some of the challenges related to high temperature sintering. For example, Ultra Low Temperature Cofired Ceramics (ULTCC) can be fired between 450° C. and 750° C. See, e.g., He et al., "Low-Temperature Sintering $Li_2MoO_4/Ni_{0.5}Zn_{0.5}Fe_2O_4$ Magneto-Dielectric Composites for High-Frequency Application," *J. Am. Ceram. Soc.* 2014: 97(8):1-5. In addition, the dielectric properties of $Li_2MoO_4$ can be improved by moistening water-soluble $Li_2MoO_4$ powder, compressing it, and post processing the resulting samples at 120° C. See Kahari et al., *J. Am. Ceram. Soc.* 2015:98(3):687-689. Even so, while the particle size of $Li_2MoO_4$ powder was less than 180 microns, Kahari teaches that smaller particle sizes complicates the even moistening of the powder, thereby resulting in clay-like clusters, non-uniform density, warpage and cracking, and ultimately concluding that a large particle size is advantageous.

SUMMARY

The present invention addresses these and other challenges by providing a cold sintering process (CSP) in conjunction with the polymerization of monomers and oligomers to yield cold-sintered ceramic polymer composites. The process enables a large variety of ceramic polymer composites to be produced through sintering steps occurring at low temperatures and modest pressures.

Thus, in one embodiment, the invention provides a process for making a cold-sintered ceramic polymer composite, comprising
  a. combining at least one inorganic compound in the form of particles having a number average particle size of less than about 30 μm with at least one monomer, reactive oligomer, reactive polymer, or combination thereof and a solvent in which the inorganic compound is at least partially soluble to obtain a mixture;
  b. subjecting the mixture to polymerization conditions to obtain a pre-ceramic polymer mixture comprising a polymer of the at least one monomer, reactive oligomer, reactive polymer, or combination thereof, the particulate inorganic compound, and the solvent; and
  c. exposing the pre-ceramic polymer mixture to a pressure of no more than about 5000 MPa and a temperature of less than about 200° C. above the boiling point of the solvent to obtain the cold-sintered ceramic polymer composite.

Another embodiment is a process for making a cold-sintered ceramic polymer composite, comprising
  a. combining at least one inorganic compound in the form of particles having a number average particle size of less than about 30 μm with a solvent in which the inorganic compound is at least partially soluble to obtain a mixture;
  b. subjecting the mixture to a pressure of no more than about 5000 MPa and a temperature of less than 200° C. above the boiling point of the solvent to obtain a cold-sintered ceramic;
  c. infusing the cold-sintered ceramic with at least one monomer, reactive oligomer, reactive polymer, or combination thereof to obtain a cold-sintered ceramic pre-polymer mixture comprising the cold-sintered ceramic and the at least one monomer, reactive oligomer, reactive polymer, or combination thereof to be polymerized into a polymer; and
  d. subjecting the cold-sintered ceramic pre-polymer mixture to polymerization conditions to obtain the cold-sintered ceramic polymer composite.

In another embodiment, the invention provides a process for making a cold-sintered ceramic polymer composite, comprising
  a. combining at least one inorganic compound in the form of particles having a number average particle size of less than about 30 μm with at least one monomer, reactive oligomer, reactive polymer, or combination thereof and a solvent in which the inorganic compound is at least partially soluble to obtain a mixture;
  b. subjecting the mixture to a pressure of no more than about 5000 MPa and a temperature of less than 200° C. above the boiling point of the solvent to obtain a cold-sintered ceramic pre-polymer mixture comprising a cold-sintered ceramic and at least one monomer, reactive oligomer, reactive polymer, or combination thereof to be polymerized into a polymer; and
  c. subjecting the cold-sintered ceramic pre-polymer mixture to polymerization conditions and form the cold-sintered ceramic polymer composite.

Still a further embodiment of the invention is a process for making a cold-sintered ceramic polymer composite comprising
  a. combining at least one inorganic compound in the form of particles having a number average particle size of less than about 30 μm with at least one monomer, reactive oligomer, reactive polymer, or combination thereof and a solvent in which the inorganic compound is at least partially soluble to obtain a mixture; and
  b. subjecting the mixture to a pressure of no more than about 5000 MPa and a temperature of less than 200° C. above the boiling point of the solvent, whereby the at least one monomer, reactive oligomer, reactive polymer, or combination undergo polymerization into a polymer, to obtain the cold-sintered ceramic polymer composite.

DETAILED DESCRIPTION

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range. The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

The invention provides, in general, a Cold Sintering Process (CSP) to obtain a cold-sintered ceramic polymer composite. The low temperatures enabled by CSP allows the incorporation of organic molecules within the ceramic, via polymerization of monomers and/or oligomers, which typically cannot withstand the high temperatures required in conventional sintering processes.

One advantage of the invention is the use of small organic molecules, such as monomers, oligomers, and reactive polymers, because they disperse well within the ceramic matrix to yield highly dispersed polymers within the sintered ceramic structure after polymerization. Another advantage of the invention exploits an ability of monomers and oligomers, relative to much larger polymers, to better 'wet-out' ceramic materials and thereby form strong interface interactions between the sintered ceramic and the polymer that is formed within. Thus, a well dispersed polymer within the ceramic with improved interactions between the ceramic and the polymer results in enhanced fracture toughness, improved tribological properties, better scratch performance, better thermal conductivity, and better electrical properties.

The cold sintering processes of the invention summarized above combine, in various steps and orders, the sintering of inorganic compounds and the in situ polymerization of monomers and/or oligomers to yield a cold-sintered ceramic polymer composite. Sintering is a process by which a material forms a dense solid, typically by the combined application of heat and pressure to the material. The sintering process described herein, like high temperature sintering, also achieves the densification of inorganic compounds, but through partial dissolution of the compounds in a solvent and the application of only modest heat, such as about 200° C. above the boiling point of the solvent.

Inorganic Compounds

Various embodiments of the processes described herein employ at least one inorganic compound that is in the form of particles. Useful inorganic compounds include, without limitation, metal oxides, metal carbonates, metal sulfates, metal sulfides, metal selenides, metal tellurides, metal arsenides, metal alkoxides, metal carbides, metal nitrides, metal halides (e.g., fluorides, bromides, chlorides, and iodides), clays, ceramic glasses, metals, and combinations thereof. Specific examples of inorganic compounds include $MoO_3$, $WO_3$, $V_2O_3$, $V_2O_5$, ZnO, $Bi_2O_3$, CsBr, $Li_2CO_3$, $CsSO_4$, $Li_2MoO_4$, $Na_2Mo_2O_7$, $K_2Mo_2O_7$, $ZnMoO_4$, $Gd_2(MoO_4)_3$, $Li_2WO_4$, $Na_2WO_4$, $LiVO_3$, $BiVO_4$, $AgVO_3$, $Na_2ZrO_3$, $LiFePO_4$, and $KH_2PO_4$. In other embodiments, precursor metal salts can be used in the form of solutions to aid or otherwise facilitate the cold-sintering process. For example, water-soluble zinc (II) salts such as zinc chloride and zinc acetate deposit water-insoluble ZnO on an existing inorganic surface. In this manner, precipitation of ZnO from the precursor solution thermodynamically favors the progression of the cold-sintering process.

In some embodiments, the inventive processes use mixtures of inorganic compounds that, upon sintering, react with each other to provide a sintered ceramic material (solid state reactive sintering). One advantage of this approach is the reliance upon comparatively inexpensive inorganic compound starting materials. Additional advantages of solid-state reactive sintering (SSRS) method includes the simplified fabrication process for proton conducting ceramics by combining phase formation, densification, and grain growth into one sintering step. See S. Nikodemski et al., *Solid State Ionics* 253 (2013) 201-210. One example of reactive inorganic compounds relates to the sintering of $Cu_2S$ and $In_2S_3$ to yield stoichiometric $CuInS_2$. See T. Miyauchi et al., Japanese Journal of Applied Physics, vol. 27, Part 2, No. 7, L1178. Another example is the addition of NiO to $Y_2O_3$, $ZrO_2$, and $BaCO_3$ to yield $BaY_2NiO_5$ upon sintering. See J. Tong, *J. Mater. Chem.* 20 (2010) 6333-6341.

The inorganic compound is present in the form of particles, such as a fine powder. Any conventional method for producing a particulate form of the inorganic compound is suitable. For example, the particles can result from various milling processes, such as ball milling, attrition milling, vibratory milling, and jet milling.

The resultant particle size, i.e., diameter, of the inorganic compound is about 100 μm or less, based on the particle number average. In various embodiments, the average number particle size is less than about 90 μm, less than about 80 μm, less than about 70 μm, less than about 60 μm, less than about 50 μm, less than about 40 μm, less than about 30 μm, less than about 20 μm, or less than about 10 μm. Any suitable method can be used to measure particle size and distribution, such as laser scattering. In illustrative embodiments, at least 80%, at least 85%, at least 90%, or at least 95% of the particles by number have a size that is less than the stated number average particle size.

According to some embodiments of the invention, the inorganic compound is combined with a solvent to obtain a mixture. In other embodiments, the inorganic compound is combined with a solvent, and at least one monomer, reactive oligomer, reactive polymer, or combination thereof to obtain a mixture. In these embodiments, the inorganic compound is present in about 50 to about 99.5 wt %, based upon the total weight of the mixture. Exemplary weight percentages of the inorganic compound in the mixture range from about 50% to about 99.5%, about 50% to about 95%, and about 80% to about 99%. Further examples of weight percentages are at least 50%, at least 55%, at least 60%, at least 65%, at least 70%, at least 75%, at least 80%, at least 85%, and at least 90%.

Solvents

The processes of the invention employ at least one solvent in which the inorganic compound has at least partial solubility. Useful solvents include water, an alcohol such as a $C_{1-6}$-alkyl alcohol, an ester, a ketone, dipolar aprotic solvents (e.g. dimethylsulfoxide (DMSO), N-methyl-2-pyrrolidone (NMP), and dimethylformamide (DMF)), and combinations thereof. In some embodiments, only a single solvent is used. In other embodiments, mixtures of two or more solvents are used.

Still other embodiments provide for aqueous solvent systems to which one or more other components are added for adjusting pH. The components include inorganic and organic acids, and organic and inorganic bases.

Examples of inorganic acids include sulfurous acid, sulfuric acid, hyposulfurous acid, persulfuric acid, pyrosulfuric acid, disulfurous acid, dithionous acid, tetrathionic acid, thiosulfurous acid, hydrosulfuric acid, peroxydisulfuric acid, perchloric acid, hydrochloric acid, hypochlorous acid, chlorous acid, chloric acid, hyponitrous acid, nitrous acid, nitric acid, pernitric acid, carbonous acid, carbonic acid, hypocarbonous acid, percarbonic acid, oxalic acid, acetic acid, phosphoric acid, phosphorous acid, hypophosphous acid, perphosphoric acid, hypophosphoric acid, pyrophosphoric acid, hydrophosphoric acid, hydrobromic acid, bromous acid, bromic acid, hypobromous acid, hypoiodous acid, iodous acid, iodic acid, periodic acid, hydroiodic acid, fluorous acid, fluoric acid, hypofluorous acid, perfluoric acid, hydrofluoric acid, chromic acid, chromous acid, hypochromous acid, perchromic acid, hydroselenic acid, selenic acid, selenous acid, hydronitric acid, boric acid, molybdic acid, perxenic acid, silicofluoric acid, telluric acid, tellurous acid, tungstic acid, xenic acid, citric acid, formic acid, pyroantimonic acid, permanganic acid, manganic acid, antimonic acid, antimonous acid, silicic acid, titanic acid, arsenic acid, pertechnetic acid, hydroarsenic acid, dichromic acid, tetraboric acid, metastannic acid, hypooxalous acid, ferricyanic acid, cyanic acid, silicous acid, hydrocyanic acid, thiocyanic acid, uranic acid, and diuranic acid.

Examples of organic acids include malonic acid, citric acid, tartartic acid, glutamic acid, phthalic acid, azelaic acid, barbituric acid, benzilic acid, cinnamic acid, fumaric acid, glutaric acid, gluconic acid, hexanoic acid, lactic acid, malic acid, oleic acid, folic acid, propiolic acid, propionic acid, rosolic acid, stearic acid, tannic acid, trifluoroacetic acid, uric acid, ascorbic acid, gallic acid, acetylsalicylic acid, acetic acid, and sulfonic acids such as p-toluene sulfonic acid.

Examples of inorganic bases include aluminum hydroxide, ammonium hydroxide, arsenic hydroxide, barium hydroxide, beryllium hydroxide, bismuth(iii) hydroxide, boron hydroxide, cadmium hydroxide, calcium hydroxide, cerium(iii) hydroxide, cesium hydroxide, chromium(ii) hydroxide, chromium(iii) hydroxide, chromium(v) hydroxide, chromium(vi) hydroxide, cobalt(ii) hydroxide, cobalt(iii) hydroxide, copper(i) hydroxide, copper(ii) hydroxide, gallium(ii) hydroxide, gallium(iii) hydroxide, gold(i) hydroxide, gold(iii) hydroxide, indium(i) hydroxide, indium(ii) hydroxide, indium(iii) hydroxide, iridium(iii) hydroxide, iron(ii) hydroxide, iron(iii) hydroxide, lanthanum hydroxide, lead(ii) hydroxide, lead(iv) hydroxide, lithium hydroxide, magnesium hydroxide, manganese(ii) hydroxide, manganese(vii) hydroxide, mercury(i) hydroxide, mercury(ii) hydroxide, molybdenum hydroxide, neodymium hydroxide, nickel oxo-hydroxide, nickel(ii) hydroxide, nickel(iii) hydroxide, niobium hydroxide, osmium(iv) hydroxide, palladium(ii) hydroxide, palladium(iv) hydroxide, platinum(ii) hydroxide, platinum(iv) hydroxide, plutonium(iv) hydroxide, potassium hydroxide, radium hydroxide, rubidium hydroxide, ruthenium(iii) hydroxide, scandium hydroxide, silicon hydroxide, silver hydroxide, sodium hydroxide, strontium hydroxide, tantalum(v) hydroxide, technetium(ii) hydroxide, tetramethylammonium hydroxide, thallium(i) hydroxide, thallium(iii) hydroxide, thorium hydroxide, tin (ii) hydroxide, tin(iv) hydroxide, titanium(ii) hydroxide, titanium(iii) hydroxide, titanium(iv) hydroxide, tungsten(ii) hydroxide, uranyl hydroxide, vanadium(ii) hydroxide, vanadium(iii) hydroxide, vanadium(v) hydroxide, ytterbium hydroxide, yttrium hydroxide, zinc hydroxide, and zirconium hydroxide.

Organic bases typically are nitrogenous, as they can accept protons in aqueous media. Exemplary organic bases include primary, secondary, and tertiary $(C_{1-10})$-alkylamines, such as methyl amine, trimethylamine, and the like. Additional examples are $(C_{6-10})$-arylamines and $(C_{1-10})$-alkyl-$(C_{6-10})$-aryl-amines Other organic bases incorporate nitrogen into cyclic structures, such as in mono- and bicyclic heterocyclic and heteroaryl compounds. These include, for instance, pyridine, imidazole, benzimidazole, histidine, and phosphazenes.

In some processes described herein, the inorganic compound is combined with the solvent to obtain a mixture. According to various embodiments, the solvent is present in about 40% or less by weight, based upon the total weight of the mixture. Alternatively, the weight percentage of the solvent in the mixture is 35% or less, 30% or less, 25% or less, 20% or less, 15% or less, 10% or less, 5% or less, 3% or less, or 1% or less.

Monomers, Oligomers, Polymerization Methods, and Polymers

Various steps of the processes described herein introduce at least one monomer, reactive oligomer, or combination thereof for polymerization that ultimately yields the cold-sintered ceramic polymer composite. The inorganic compound can be cold-sintered alone, as described herein, or co-sintered with one or more monomers and/or reactive oligomers.

According to some embodiments of the inventive processes, the monomer, reactive oligomer, or combination thereof is infused in a liquid state into a cold-sintered ceramic. Infusing can occur passively, such as by immersion. If the monomer or cold-sintered ceramic oligomer is not a liquid at room temperature, heat can be applied to create a melt of the monomer or oligomer, whereupon infusion can ensue.

Alternatively, infusing can comprise more active means, such as by injection of the monomer or oligomer in the liquid state into the cold-sintered ceramic. In still other embodiments, optionally in combination with any others described herein, the monomer, reactive oligomer, reactive polymer, or combination thereof is combined with an infusing solvent, which is any suitable solvent described herein.

The resultant solution (full solubility) or suspension (partial solubility) can then be infused into the cold-sintered ceramic.

According to various embodiments, the monomer, reactive oligomer, or combination thereof is present in the mixture or cold-sintered ceramic pre-polymer mixture in about 1% to about 70% (w/w) based upon the total weight of the mixture or cold-sintered ceramic pre-polymer mixture. Illustrative weight percentages also include about 0.2% to about 40%, about 0.5% to about 25%, about 3% to about 65%, about 5% to about 60%, about 5% to about 50%, about 10% to about 55%, about 15% to about 50%, and about 20% to about 45%, based upon the total weight of the mixture or cold-sintered ceramic pre-polymer mixture.

The processes described herein are not limited to particular classes of monomers. Indeed, a wide variety of monomers already is well-known to those who are skilled in the polymer arts. In general, monomers, like the corresponding reactive oligomers made from them, can be chosen based on a variety of factors, such as compatible methods for polymerization, reactivity, properties of resultant polymers, copolymers, polymer blends, and the like. Described below for illustrative guidance are various monomers and suitable methods for polymerizing them for use in the inventive processes.

Ring-Opening Polymerization

Ring-opening polymerization methods are advantageous because they can produce polymers generally possessing low melt viscosities. The polymers also are readily soluble in organic solvents, combinations of organic solvents with water, and sometimes even water alone. Exemplary cyclic monomers for use in ring-opening polymerization, in accordance with the processes described herein, include cyclic ethers, cyclic amines, lactones, lactams, cyclic sulfides, cyclic siloxanes, cyclic phosphites and phosphonites, cyclic imino ethers, cyclic olefins, cyclic carbonates, and cyclic esters. Additional examples of cyclic monomers and oligomers include epoxides, cyclic phosphazenes, cyclic phosphonates, cyclic organosiloxanes, cyclic carbonate oligomers, and cyclic ester oligomers. Additional illustrative monomers are cyclic monomers that bear functional groups such as formals, thioformals, sulfides, disulfides, anhydrides, thiolactones, ureas, imides, and bicyclic monomers. Further examples of suitable cyclic monomers for forming polymers in the presence of ceramic materials can be found in the Encyclopedia of Polymer Science and Engineering, Second Edition, Volume 14, pages 622-647, John Wiley and Sons (1988).

Still further examples of ring systems that are useful in the inventive processes are aromatic macrocyclic aromatic carbonate oligomers, and macrocyclic polyalkylene carboxylate ester oligomers. When polymerized, these oligomers yield aromatic polycarbonates and polyesters. Representative cyclic compositions, methods of forming these ring systems, and polymerization conditions for producing high molecular weight polycarbonates and polyesters from them can be found, for example, in U.S. Pat. Nos. 4,644,053 and 5,466,744.

Many cyclic monomers and oligomers are liquids at standard temperature and pressure, while others are low temperature melting solids to give low viscosity liquids under the same conditions. In these instances, according to various embodiments, such cyclic monomers and oligomers can be used neat in the processes described herein, i.e., without dilution by a solvent. Polymers resulting from these monomers can vary widely in molecular weights depending upon polymerization conditions, such as catalyst loading and the presence and concentration of any chain-termination agents.

The polymerizability and rates of polymerization of cyclic monomers can be influenced both by ring size and by the substituents on the rings. In general, smaller ring sizes of three to five ring members or otherwise strained rings usually have high heats of polymerization due to ring strain and other factors. Larger rings can often be polymerized even with low heats of polymerization through entropy contributions.

Radical Polymerization

In various embodiments, the invention provides for radical polymerization methods that are useful in combination with the cold sintering processes described herein. Many monomers suitable for this purpose contain unsaturated homo or heteronuclear double bonds, dienes, trienes, and/or strained cycloaliphatics. Examples of monomers for use in radical polymerization reactions include acrylic acids, acrylamides, acrylic esters, esters of acrylic and methacrylic acids (e.g. n-butyl acrylate, 2-hydroxyethyl methacrylate), amides of acrylic and methacrylic acids (e.g. n-isopropyl acrylamide), acrylonitriles, methyl methacrylates, (meth) acrylates of polyhydric alcohols (e.g. ethylene glycol, trimethylolpropane), styrenes, styrene derivatives (e.g., 1,4 divinylbenzene, p-vinylbenzyl chloride, and p-acetoxy styrene), 4-vinyl pyridines, n-vinyl pyrrolidones, vinyl acetates, vinyl chlorides, vinyl fluorides, vinylidene fluorides, ethylene, propylene, butadiene, chloroprene, and vinyl ethers.

Radical polymerization can be initiated by the generation of primary radicals. Illustrative initiators for this purpose include azo initiators (e.g. dialkyldiazenes, AIBN), peroxides (e.g. dicumylperoxide, persulfate, and ethylmethylketone peroxide), diphenyl compounds, photo-initiators (e.g. alpha-hydroxyketones, alpha-aminoketones, acylphosphine oxide, oxime esters, benzophenones, and thioxanthones), and silylated benzopinacols. In some embodiments, the particulate inorganic compound (e.g. $ZnO_2$) that participates in the cold sintering processes described herein can be photo-induced and thereby generate radicals for in situ polymerization.

Thermal Polymerization

Thermal polymerization methods are useful in the inventive processes. Monomers that can be polymerized upon heating are those that typically have one or more carbon-carbon triple bonds (e.g., ethynyl and propargyl groups) and/or heteroatomic unsaturated bonds, such isocyanates, cyanates, and nitriles. In some embodiments, the rate of polymerization and resulting formation of a polymer composite can be controlled by adding polymerization accelerators that contain bi, tri- or multifunctional reactive groups, such as alkynyl groups.

Alternatively, ring strained aliphatic monomers (e.g., hydrocarbons) can be ring-opened by their exposure to sufficient external and capillary pressure. In addition, or alternatively, polymerization of monomers can be catalyzed by the particulate inorganic compound or by the cold-sintered ceramic. In some embodiments, the polymerization onset temperatures are higher than temperatures employed in the cold sintering steps; in these embodiments, the application of greater external pressure can substantially decrease the required polymerization onset temperature.

Examples of monomers for use in thermal polymerization include cyanates, benzocylcobutenes, alkynes, phthalonitriles, nitriles, maleimides, biphenylenes, benzoxazines, norbornenes, cylic aliphatics, bridging cyclohydrocarbons, and cyclooctadienes.

Reactive Oligomer

Many of the monomers described herein can be oligomerized into oligomers for use in the inventive processes, optionally in combination with (co)polymerization with other monomers and/or oligomers. The oligomers must be reactive, therefore.

A reactive oligomer, as the term is used herein, is an oligomer that bears one or more chemical moieties that are capable of participating in polymerization reactions by which the oligomer is incorporated into a final polymer. In accordance with the generally accepted definition in the art, an oligomer is not a polymer, but rather a molecule of intermediate relative molecular mass, the structure of which essentially comprises a small plurality of units derived, actually or conceptually, from monomer molecules of lower relative molecular mass. In this context, an oligomer is a molecule of intermediate relative molecular mass if the oligomer, in contrast to a polymer, exhibits properties that vary significantly with the removal of one or a few of the monomeric units. See IUPAC, Compendium of Chemical Terminology, 2nd ed. (the "Gold Book"), compiled by A. D. McNaught and A. Wilkinson, Blackwell Scientific Publications, Oxford (1997).

Reactive Polymer

Many of the monomers described herein can be polymerized into low molecular weight polymers that are then used in the inventive processes, optionally in combination with (co)polymerization with other monomers and/or oligomers. The polymers as used in this context are reactive, therefore.

A reactive polymer, as the term is used herein, is a polymer that bears one or more chemical moieties that are capable of participating in further polymerization reactions by which the reactive polymer of a first molecular weight is incorporated into a final polymer of a second and higher molecular weight. In other words, a reactive polymer is a molecule of lower relative molecular mass, compared to the polymer that results in the inventive cold-sintered ceramic polymer composite. An example of a reactive polymer, according to an embodiment, is polybutylacrylate (see Experimental Example 1). Additional non-limiting examples include polyacrylonitrile, poly(vinyl cinnamate), and poly(maleic anhydride).

Polymers

A great variety of polymers can result from the polymerization of monomers, oligomers, and combinations thereof as described herein. Examples of polymer architectures contemplated for manufacture and use in the inventive processes include linear and branched polymers, copolymers such as random copolymers and block copolymers, and cross-linked polymers. Also contemplated are polymer blends, blends of copolymers, blends of cross-linked polymers (i.e., interpenetrative networks), and blends of cross-linked polymers with non-crosslinked polymers.

Exemplary classes of polymers include polyimides, a polyamides, polyesters, polyurethanes, polysulfones, polyketones, polyformals, polycarbonates, and polyethers. Additional classes and specific polymers include acrylonitrile butadiene styrene (ABS) polymer, an acrylic polymer, a celluloid polymer, a cellulose acetate polymer, a cycloolefin copolymer (COC), an ethylene-vinyl acetate (EVA) polymer, an ethylene vinyl alcohol (EVOH) polymer, a fluoroplastic, an acrylic/PVC alloy, a liquid crystal polymer (LCP), a polyacetal polymer (POM or acetal), a polyacrylate polymer, a polymethylmethacrylate polymer (PMMA), a polyacrylonitrile polymer (PAN or acrylonitrile), a polyamide polymer (PA, such as nylon), a polyamide-imide polymer (PAI), a polyaryletherketone polymer (PAEK), a polybutadiene polymer (PBD), a polybutylene polymer (PB), a polybutylene terephthalate polymer (PBT), a polycaprolactone polymer (PCL), a polychlorotrifluoroethylene polymer (PCTFE), a polytetrafluoroethylene polymer (PTFE), a polyethylene terephthalate polymer (PET), a polycyclohexylene dimethylene terephthalate polymer (PCT), a polycarbonate polymer (PC), poly(1,4-cyclohexylidene cyclohexane-1,4-dicarboxylate) (PCCD), a polyhydroxyalkanoate polymer (PHA), a polyketone polymer (PK), a polyester polymer, a polyethylene polymer (PE), a polyetheretherketone polymer (PEEK), a polyetherketoneketone polymer (PEKK), a polyetherketone polymer (PEK), a polyetherimide polymer (PEI), a polyethersulfone polymer (PES), a polyethylenechlorinate polymer (PEC), a polyimide polymer (PI), a polylactic acid polymer (PLA), a polymethylpentene polymer (PMP), a polyphenylene oxide polymer (PPO), a polyphenylene sulfide polymer (PPS), a polyphthalamide polymer (PPA), a polypropylene polymer, a polystyrene polymer (PS), a polysulfone polymer (PSU), a polytrimethylene terephthalate polymer (PTT), a polyurethane polymer (PU), a polyvinyl acetate polymer (PVA), a polyvinyl chloride polymer (PVC), a polyvinylidene chloride polymer (PVDC), a polyamideimide polymer (PAI), a polyarylate polymer, a polyoxymethylene polymer (POM), a styrene-acrylonitrile polymer (SAN), a polycarbonate (PC), acrylonitrile butadiene styrene (ABS), polybutylene terephthalate (PBT), polyethylene terephthalate (PET), polyetherimide (PEI), poly(p-phenylene oxide) (PPO), polyamide(PA), polyphenylene sulfide (PPS), polyethylene (PE) (e.g., ultra high molecular weight polyethylene (UHMWPE), ultra low molecular weight polyethylene (ULMWPE), high molecular weight polyethylene (HMWPE), high density polyethylene (HDPE), high density cross-linked polyethylene (HDXLPE), cross-linked polyethylene (PEX or XLPE), medium density polyethylene (MDPE), low density polyethylene (LDPE), linear low density polyethylene (LLDPE) and very low density polyethylene (VLDPE)), polypropylene (PP), and combinations thereof.

Other useful polymers are ionic polymers or oligomers ("ionomers"). A key feature of ionomers resides in a relatively modest concentration of acid or ionic groups that are bound to an oligomer/polymer backbone, and that confer substantial changes in the physical, mechanical, optical, dielectric, and dynamic properties to a polymer and, hence, to the cold-sintered ceramic polymer composite. For example, polymers that bear acid functional groups can undergo interchain and physical crosslinks via hydrogen bonding between acid groups. Illustrative oligomers include sulfonated oligomers. In addition, fatty acids or tetra-alkyl ammonium salts can be introduced by the inventive processes in order to promote additional ionic interactions.

Additional Components

Various embodiments of the inventive processes contemplate the introduction of one or more additional materials to the mixture for cold sintering, or to the cold-sintered ceramic. Any combination of these materials is possible to ease manufacture of and/or tailor the composition and properties of the cold-sintered ceramic polymer composite.

Supramolecular Structures

For instance, some embodiments provide for the addition of supramolecular structures, which are generally characterized by an assembly of substructures that are held together by weak interactions, such as non-covalent bonds can be used. The interactions can weaken at temperatures that are employed for cold-sintering, thereby liberating substructure molecules that can flow through or into newly-created pores of the particulate inorganic compound or cold-sintered ceramic. Upon cooling, the substructure molecules can reassemble into supramolecular structures that are embedded into the cold-sintered ceramic or cold-sintered ceramic pre-polymer mixture. Typical compounds suitable for this purpose are hydrogen bonded molecules, which can possess, for instance mono, bi, tri-, or quadruple hydrogen bonds. Other structures exploit host-guest interactions and in this way create supramolecular (polymeric) structures.

Examples of supramolecular structures include macrocycles such as cyclodextrins, calixarenes, cucurbiturils, and crown ethers (host-guest interaction based on weak interactions); amide or carboxylic acid dimers, trimer or tetramers such as 2-ureido-4[1H]-pyrimidinones (via hydrogen bonding), bipyridines or tripyridines (via complexation with metals), and various aromatic molecules (via pi-pi interaction).

Sol-Gels

Other embodiments provide for the introduction of sol-gels into the mixture of cold-sintered ceramic. The sol-gel process consists of a series of hydrolysis and condensation reactions of a metal alkoxide, and in some instances alkoxysilanes are also used. Hydrolysis is initiated by the addition of water to the alkoxide or silane solution under acidic, neutral, or basic conditions. Thus, by adding a small amount of water to a metal alkoxide, a polymeric nanocomposite can be obtained. Examples of compounds that are useful for making sol-gels include silicon alkoxides such as tetraalkyl orthosilicates (e.g., tetraethyl orthosilicate), silsesquioxanes, and phenyltriethoxysilanes.

Polymerization Aids

In various embodiments, optionally in combination with any other embodiments, the polymerization steps in the inventive processes can include one or more components for facilitating or modulating the polymerization reaction. For instance, non-limiting examples well-known to those of skill in the polymer arts include polymerization catalysts and catalyst promoters, polymerization catalyst inhibitors, polymerization co-catalysts, photo initiators in combination with light sources, phase transfer catalysts, chain transfer agents, and polymerization accelerators. In some embodiments, these components are incorporated without dilution or dissolution into the mixture. In other embodiments, the components are partially or fully dissolved in the solvent that is used in the inventive processes. Alternatively, the components can be coated onto the inorganic compound particles, such as by first dissolving the components in a suitable solvent, contacting the resulting solution with the particles, and allowing (or causing) the solvent to evaporate and thereby yield coated particles. In accordance with still other embodiments, the inorganic compound particles are first cold sintered, and the resulting cold-sintered ceramic can be coated with one or more of the components.

In accordance with some embodiments, the processes described herein do not include a polymerization catalyst. For example, an inorganic compound or the resulting cold-sintered ceramic acts as a polymerization catalyst, obviating the need to utilize an added catalyst. In other embodiments, an acid or base admixed with the solvent facilitates polymerization, such as by initiation, without the need for an added polymerization catalyst.

In some embodiments, one or more of the components described above is encapsulated. For example, a polymerization catalyst can be an encapsulated catalyst. The use of encapsulated catalysts allows the utilization of higher molecular reactants and use of heat during the cold sintering process without pre-cure of the reactants. For instance, encapsulated catalysts prevent premature reaction of the various reactants during storage and processing and yet, upon the rupture of the capsules by a pre-determined event such as the application of heat, pressure, or solvation, produce rapid cure. The use of encapsulated catalysts is useful in some embodiments of the invention wherein cold-sintering and polymerization are carried performed substantially simultaneously.

The encapsulated catalysts typically are produced by deposition of a shell around the catalyst. The catalyst can be contained in one single cavity or reservoir within the capsule or may be in numerous cavities within capsule. The thickness of the shell can vary considerably depending on the materials used, loading level of catalyst, method of forming the capsule, and intended end-use. Loading levels of the catalyst range from about 5 to about 90%, from about 10-90%, or from about 30-90%. Certain encapsulation processes lend themselves to higher core volume loading than others. More than one shell may be desirable to ensure premature breakage or leaking. The encapsulated catalysts can be made by any of a variety of micro-encapsulation techniques including but not limited to coacervation, interfacial addition and condensation, emulsion polymerization, microfluidic polymerization, reverse micelle polymerization, air suspension, centrifugal extrusion, spray drying, prilling, and pan coating (see, e.g., US 2007/017362).

Fillers

According to some embodiments, the cold-sintered ceramic polymer composite can include one or more fillers. The filler is present in about 0.001 wt % to about 50 wt % of the composite, or about 0.01 wt % to about 30 wt %, or about 0.001 wt % or less, or about 0.01 wt %, 0.1, 1, 2, 3, 4, 5, 10, 15, 20, 25, 30, 35, 40, 45 wt %, or about 50 wt % or more. The filler can be homogeneously distributed in the composite. The filler can be fibrous or particulate. The filler can be aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dehydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin including various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers) such as asbestos, carbon fibers, glass fibers; sulfides such as molybdenum sulfide, zinc sulfide, or the like; barium compounds such as barium titanate, barium ferrite, barium sulfate, heavy spar, or the like; metals and metal oxides such as particulate or fibrous aluminum, bronze, zinc, copper and nickel, or the like; flaked fillers such as glass flakes, flaked silicon carbide, aluminum diboride, aluminum flakes, steel flakes or the like; fibrous fillers, for example short inorganic fibers such as those derived from blends including at least one of aluminum silicates, aluminum oxides, magnesium oxides, and calcium sulfate hemihydrate or the like; natural fillers and reinforcements, such as wood flour obtained by pulverizing wood, fibrous products such as kenaf, cellulose, cotton, sisal, jute, flax, starch, corn flour, lignin, ramie, rattan, agave, bamboo, hemp, ground nut shells, corn, coconut (coir), rice grain husks or the like; organic fillers such as polytetrafluoroethylene, reinforcing organic fibrous fillers formed from organic polymers capable of forming fibers such as poly (ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) or the like; as well as fillers such as mica, clay, feldspar, flue dust, fillite, quartz, quartzite, perlite, Tripoli, diatomaceous earth, carbon black, or the like, or combinations including at least one of the foregoing fillers. The filler can be talc, kenaf fiber, or combinations thereof. The filler can be coated with a layer of metallic material to facilitate conductivity, or surface treated with silanes, siloxanes, or a combination of silanes and siloxanes to improve adhesion and dispersion within the composite. The filler can be selected from carbon fibers, mineral fillers, and combinations thereof. The filler can be selected from mica, talc, clay, wollastonite, zinc sulfide, zinc oxide, carbon fibers, glass fibers, ceramic-coated graphite, titanium dioxide, or combinations thereof.

Cold-Sintered Ceramic Polymer Composite

Also contemplated in various embodiments is a cold-sintered ceramic polymer composite that is produced by any of the processes that are described herein. The cold-sintering steps of the processes can result in the densification of the inorganic compound. Thus, according to some embodiments, the cold-sintered ceramic polymer composite, or the cold-sintered ceramic, exhibits a relative density of at least 70% as determined by mass/geometry ratio, the Archimedes method, or an equivalent method. The relative density can be at least 75%, 80%, 85%, 90%, or 95%.

Briefly, the Archimedes method was employed to determine the density of samples using a KERN ABS-N/ABJ-NM balance equipped with an ACS-A03 density determination set. Dried samples (e.g., pellets) were first weighed ($W_{dry}$) and subjected to boiling in 2-propanol for a period of 1 h. The samples were then suspended in 2-propanol at a known temperature to determine the apparent mass in liquid ($W_{sus}$), removed, and the excess liquid wiped from the surface of the sample using a tissue moistened with 2-propanol. The saturated sample were then immediately weighed in air ($W_{sat}$). The density is then determined by:

Density=$W_{dry}/(W_{sat}-W_{sus})$*density of solvent where the density of 2-propanol was taken to be 0.786 g/cm³ at 20° C., 0.785 g/cm³ at 21° C., and 0.784 g/cm³ at 22° C.

The geometric method for determining density, also known as the "geometric (volume) method," involves measuring the diameter (D) and thickness (t) of cylindrical samples using, e.g., a digital caliper. The volume of a cylinder can be calculated from the formula $V=\pi(D/2)^2 \times t$. The mass of the cylindrical sample was measured with an analytical balance. The relative density was determined by dividing the mass by the volume.

The volume method is comparable to Archimedes method for simple geometries, such as cubes, cuboids and cylinders, in which it is relatively easy to measure the volume. For samples with highly irregular geometry, accurately measuring the volume may be difficult, in which case the Archimedes method may be more appropriate to measure density.

In some embodiments, any of the inventive processes described herein further comprises processing steps that, for example, can affect the physical form or geometry of the cold-sintered ceramic polymer composite. For instance, additional steps can include one or more of injection molding, compression molding, autoclaving, and calendering.

Alternatively, or in addition, embodiments provide for post-treatment or post-curing steps. For instance, the cold-sintered ceramic polymer composite can be subjected to optionally pre-programmed temperature and/or pressure ramps, holds, or cycles, wherein the temperature or pressure or both are increased or decreased, optionally multiple times, to promote completion of polymerization or cross-linking.

EXAMPLES

The following examples further illustrate additional embodiments of the invention. Hence, the examples are not intended to limit the scope of the invention.

Unless otherwise specified, recited particle sizes for ceramic powder and polymer controls are d50 volume average values.

Throughout the examples 1-4, percentages of components can be varied. The following table presents illustrative mixtures that are useful in carrying out the inventive and exemplary processes. Weight percentages are given based upon the total weight of mixture.

| Inorganic Compound (wt %) | Monomer (wt %) | Polymerization Accelerator (wt %) |
|---|---|---|
| 90 | 10 | 0 |
| 80 | 20 | 0 |
| 80 | 10 | 10 |
| 70 | 30 | 0 |
| 70 | 20 | 10 |
| 60 | 40 | 0 |
| 60 | 30 | 10 |
| 60 | 20 | 20 |
| 50 | 50 | 0 |
| 50 | 40 | 10 |

Example 1

Powderized $MoO_3$ is mixed with a monomer, such as acrylate or a cyclic ether. To the resulting mixture is added deionized water or an alcohol solvent (1-2 wt %).

Alternatively, the monomer is first dissolved in one or more organic solvents then blended with the $MoO_3$ powder. The solvent or solvent mixture is then removed prior to the introduction of water (1-2 wt %) before sintering.

The mixture is stirred in a mortar and pestle, then hot-pressed with a steel die into dense pellets (~10 mm in diameter and ~1-2 mm in height) under a uniaxial pressure of around 50-600 MPa at 120° C. The cold-sintering process and polymerization occur simultaneously, or the polymerization is initiated before the cold-sintering process. The die is maintained at 120° C. for more than 1 h. Finally, the pellets of cold-sintered ceramic polymer composite are removed and then placed into an oven at 120° C. for 6 h to remove any remaining water.

Example 2

Powderized $MoO_3$ and deionized water or an alcohol (1-2 wt %) are mixed to obtain mixture. The mixture is stirred in a mortar and pestle, and the moist mixture is hot-pressed with a steel die into dense pellets (~10 mm in diameter and ~1-2 mm in height) under a uniaxial pressure of around 50-600 MPa at 120° C. The die maintained at 120° C. for more than 1 h. The resulting pre-sintered ceramic is mixed with a monomer, such as acrylate or a cyclic ether, and the monomer is polymerized, optionally in the presence of a polymerization catalyst. The resulting pellets are placed into an oven at 120° C. for 6 h to remove any traces of water residue obtain the cold-sintered ceramic polymer composite.

Example 3

Powderized $MoO_3$ is mixed with a reactive monomer, such as acrylate or a cyclic ether, and then pressed into soft pellets under a low pressure (30-70 MPa) at room temperature. Then, the pellets are exposed to a humid atmosphere, such as water vapor generated by heating deionized water or in a humidity chamber, for 10-360 min. The moistened pellets are then hot-pressed with a steel die into dense pellets under a uniaxial pressure of 80-570 MPa at 120° C. The die is maintained at 120° C. for more than 1 h. Finally, the pellets were placed into an oven at 120° C. for 6 h to remove any water residue, thereby yielding the cold-sintered ceramic polymer composite.

Example 4

Powderized $MoO_3$ is mixed with an alkynyl-substituted monomer, such as bisphenol A (BPA) substituted with ethynyl groups (i.e., —CCH), and an alkynyl-substituted accelerator, such as 1,1,1-tris(4-hydroxyphenyl)ethane (THPE) that is substituted with ethynyl groups, which enhances network formation. The resulting mixture is pressed into soft pellets under a low pressure (30-70 MPa) at room temperature. Then, the pellets are exposed to a humid atmosphere, such as from water vapor generated by heating deionized water or in a humidity chamber for 10-360 min. The moistened pellets are then hot-pressed with a steel die into dense pellets under a uniaxial pressure of 80-570 MPa at 120° C., whereby cold-sintering occurs in conjunction with polymerization and branching resulting from reactions between ethynyl groups. The die is maintained at 120° C. for more than 1 h. Finally, the pellets were placed into an oven at 120° C. for 6 h to remove any water residue, thereby yielding the cold-sintered ceramic polymer composite.

Using an analogous procedure, another cold-sintered ceramic polymer composite is prepared wherein the BPA and THPE are substituted with phenyl ethynyl groups (i.e., —CC-Ph). The temperature for inducing polymerization and cold sintering is increased to about 370° C. The temperature can be lowered to about 300° C. when higher pressures are applied, e.g., 400-570 MPa.

Alternatively, in another example wherein the BPA and THPE are substituted with phenyl ethynyl groups, the temperature for inducing polymerization and cold sintering is about 150° C. under a uniaxial pressure of 80-570 MPa. After cold-sintering has occurred, the die is subjected to a temperature of about 300-370° C. to ensure complete polymerization.

Additional Experimental and Comparative Examples

General Materials and Information

Lithium molybdate (LMO) was acquired from Sigma-Aldrich having a number fraction particle size (in micrometer) measured with Malvern Mastersizer 2000: d10=5.1, d50=6.7, d90=15.1. LMO was milled with a Retzsch ZM200 mill with a 0.5 mm sieve, and the milled LMO exhibited a number average particle size of d10=0.34, d50=0.47, d90=0.75. The theoretical density of LMO is 3.03 g/cc.

Zinc oxide was acquired from Sigma Aldrich, and it exhibited a Brunauer-Emmett-Teller (BET) surface area of 3.5 $m^2$/gram to 9 $m^2$/gram, which relates to an average particle size of 200 nm. The theoretical density is 5.61 g/cc.

Sodium chloride was acquired from Sigma Aldrich and milled in manner as described above to give a number average particle size of d10=0.33, d50=0.43, d90=0.81. The theoretical density is 2.126 g/cc.

Butyl acrylate 99+% containing hydroquinone monomethyl ether as stabilizer was acquired from Acros Organics and used as received. Styrene, containing 4-tert-butylcatechol stabilizer, was acquired from Sigma-Aldrich and used as received. Azobisisobutyronitrile (AIBN) 98+% was acquired from Sigma-Aldrich and used as received. 4-ethynylphthalic anhydride (EPA) was acquired from Nexam Chemical (Lund, Sweden) and used as received. Bisphenol A diglycidyl ether (BADGE) was acquired from Sigma-Aldrich and used as received. 1,10 decanedicarboxylic acid 99% (DDDA) was acquired from Acros Organics and used as received. Epsilon-Caprolactone 99% and Zinc(II) acetylacetonate were acquired from Acros Organics and used as received.

Water used in the examples is de-ionized water.

The die is stainless steel with 13 mm diameter cavity. The press is a Specac Atlas 15T manual hydraulic press. The heater is a 76 mm aluminum band-heater (type DAK) using temperature controller MCT 1-E, supplied by Ihne & Tesch, Germany.

Relative density (%)=(measured density/theoretical density)*100.

Comparative Example 1: Pure LMO Cold Sintered Ceramic

LMO (2 g) was added to a mortar and ground with a pestle to number average particle size (d50) of about 7.35 micron. To this powder 200 microliter water was added and mixed for about 2 minutes to form a paste like substance. The substance was added to the stainless steel die and pressed into a ceramic pellet with high density. Experiments were conducted with varying pressure, time and temperature and the effect on relative density is plotted in table 1 below.

TABLE 1

| Effect of temperature, holding pressure and pressure on relative density | | | |
|---|---|---|---|
| Temperature (° C.) | Hold Time (min) | Pressure (MPa) | Relative Density (%) |
| 23 | 1 | 225 | 90.1 |
| 23 | 5 | 225 | 92.8 |
| 23 | 10 | 225 | 93.8 |
| 23 | 20 | 225 | 94.8 |
| 23 | 30 | 150 | 92.7 |
| 23 | 30 | 225 | 94.9 |
| 23 | 30 | 300 | 95.5 |
| 23 | 30 | 375 | 95.7 |
| 100 | 30 | 300 | 97.6 |
| 200 | 30 | 300 | 98.1 |

Comparative Example 2: Pure Milled-LMO Cold Sintered Ceramic

The purpose of this example was to study properties of milled-LMO samples of varying thickness as ceramic pellets of 1 mm, 2 mm and 5.5 mm.

The 1 mm pure LMO sample was prepared by adding 0.80 gram milled-LMO into a mortar and 40 microliter water was added to the LMO powder, and mixing with a pestle for about 2 minutes to form a paste like substance. Half of the mixture (~0.42 gram) was added to the stainless steel die; a metal pellet was separating the second half of the mixture in the die, creating 2 samples in one process. The samples were pressed for 20 minutes at 100° C. with a pressure of 300 MPa and then cooled under pressure for 20 minutes.

The 2 mm pure LMO sample was prepared by adding 1.60 gram milled-LMO into a mortar and 80 microliter water was added to the LMO powder, and mixing with a pestle for about 2 minutes to form a paste like substance. Half of the mixture (~0.84 gram) was added to the stainless steel die; a metal pellet was separating the second half of the mixture in the die, creating 2 samples in one process. The samples were pressed for 20 minutes at 100° C. with a pressure of 300 MPa and then cooled under pressure for 20 minutes.

The 5.5 mm pure LMO sample was prepared by adding 2.20 gram milled-LMO into a mortar and 110 microliter water was added to the LMO powder, and mixing with a pestle for about 2 minutes to form a paste like substance. The mixture was added to the stainless steel die and the sample is pressed for 20 minutes at 100° C. with a pressure of 300 MPa and then cooled under pressure for 20 minutes. Characteristics of the pellets are presented in Table 2 below.

TABLE 2

Properties and standard deviation of sintered milled-LMO ceramic pellets

| Desired Thickness (mm) | Measured Thickness (mm) | Density (g/cc) | Relative Density (%) |
| --- | --- | --- | --- |
| 1.0 | 1.11 ± 0.05 | 2.824 ± 0.044 | 93.2 ± 1.4 |
| 2.0 | 2.12 ± 0.21 | 2.811 ± 0.065 | 92.8 ± 2.2 |
| 5.5 | 5.53 ± 0.07 | 2.901 ± 0.008 | 95.7 ± 0.3 |
| Average | | 2.847 ± 0.058 | 94.0 ± 1.9 |

Experimental Example 1: LMO/(Poly)Butyl Acrylate Composites Via Reactive Cold-Sintering LMO pellets containing up to 3.6 wt % (poly)butyl acrylate were prepared through in-situ reactive cold sintering employing a post-polymerization step.

A low molecular weight (poly)butyl acrylate sample (ca. 19,500 da.) was first prepared by treating a mixture of butyl acrylate containing 1 wt % azobisisobutyronitrile (AIBN) at 100° C. for ~2 min, before rapidly quenching the mixture in an ice bath.

Separately, 2.0 g of milled LMO powder was added to a mortar, wherein a 5 wt % mixture of the described low molecular weight (poly)butyl acrylate and 100 μL of de-ionized water was added. The resultant mixture was ground to a paste-like consistency using a pestle and then transferred to a stainless steel die at room temperature. Densification was achieved by pressing the mixture at a pressure of 375 MPa for 30 min, whereupon the final densified pellet was removed from the die and fractured in two distinct pieces. One piece was thermally treated at a temperature of 140° C. for 15 h to effect a marked increase in average molecular weight of (poly)butyl acrylate (table 3), while the other piece was analyzed for polymer properties.

The organic content of the polymerized pellet was determined by thermogravimetric analysis in air, allowing for determination of relative density [(poly)butyl acrylate $\rho=1.070$ g/cc].

TABLE 3

LMO/(poly)butyl acrylate reactive composites sintering properties

| | Polymer content (wt %) | Density (g/cc) | Relative Density (%) | Polymer Mw | Polymer Mn | PD |
| --- | --- | --- | --- | --- | --- | --- |
| Room temperature | / | / | / | 19,531 | 5000 | 3.9 |
| 140° C., 15 h | 3.54 | 2.72 | 95.58 | 92,488 | 4402 | 21 |

Experimental Example 2: LMO/Polystyrene (PS) Composites Via Reactive Cold-Sintering In general, three thickness samples, 1 mm, 2 mm and 5.5 mm ceramic composite pellets, were manufactured by reactive cold sintering to form LMO/polystyrene composite sintered ceramic pellets. The styrene does not polymerize by itself and it therefore required an initiator to trigger the polymerization reaction. Thus, 10 mg AIBN per gram styrene was added to the styrene prior to the reactive cold sintering of LMO and polystyrene.

To produce a 1 mm LMO/PS sample, 0.42 gram milled-LMO with 21 microliter water was added to a mortar and mixed with a pestle to form a paste. To this LMO paste 100 microliter styrene (with AIBN) was added and mixed. The final mixture was transferred to the stainless steel die and heated for 1 hour at 100° C. without pressure. Then the mixture was pressurized at 300 MPa and heated for another 20 minutes at 100° C. after which it was cooled in air for 20 minutes under pressure.

To produce a 2 mm LMO/PS sample, 0.83 gram milled-LMO with 42 microliter water was added to a mortar and mixed with a pestle to form a paste. To this LMO paste 200 microliter styrene (with AIBN) was added and mixed. The final mixture was transferred to the stainless steel die and heated for 1 hour at 100° C. without pressure. Then the mixture was pressurized at 300 MPa and heated for another 20 minutes at 100° C. after which it was cooled in air for 20 minutes under pressure.

To produce a 5.5 mm LMO/PS sample, 2.5 gram milled-LMO with 125 microliter water was added to a mortar and mixed with a pestle to form a paste. To this LMO paste 600 microliter styrene (with AIBN) was added and mixed. The final mixture was transferred to the stainless steel die and heated for 1 hour at 100° C. without pressure. Then the mixture was pressurized at 300 MPa and heated for another 20 minutes at 100° C. after which it was cooled in air for 20 minutes under pressure. Properties of the cold-sintered pellets are presented in Table 4 below.

TABLE 4

LMO/polystyrene reactive composites sintering properties

| Desired Thickness (mm) | Measured Thickness (mm) | Polymer level (wt %) | Mw (g/mol) | Mn (g/mol) | Density (g/cc) | Relative Density (%) |
|---|---|---|---|---|---|---|
| 1.0 | 1.19 ± 0.03 | NA | NA | NA | 2.588 ± 0.057 | NA |
| 2.0 | 2.08 ± 0.20 | 3.65 ± 1.40 | 32404 ± 3820 | 9423 ± 92 | 2.679 ± 0.047 | 93.9 ± 1.6 |
| 5.5 | 5.64 ± 0.05 | 3.29 ± 1.92 | 23027 ± 9097 | 9100 ± 884 | 2.646 ± 0.060 | 98.5 ± 2.2 |
| Average | — | 3.41 ± 1.68 | 27715 ± 8082 | 9261 ± 590 | 2.647 ± 0.061 | 96.7 ± 3.8 |

Comparative Example 3: LMO/Polystyrene Powder Composites Cold Sintering

Low molecular weight (Mw) Polystyrene powder (PS-powder) was not readily available and therefore it was produced in house by the following procedure. Styrene (15 g) was added to a 20 ml sample vial and 0.75 gram AIBN initiator was dissolved into the styrene. The styrene was heated to 90° C. and reacted for about 5 hours to form a polymer and then the temperature was increased to 200° C. to complete the reaction. The resulting polymer exhibited a Mw of 19196 g/mol and Mn of 4866 g/mol. The PS polymer was cast on an aluminum foil, cooled, and crushed by hand. The crushed parts were ground using a Retzsch ZM200 mill with a 0.5 mm sieve, resulting in a 1.41 micron number average particle size PS-powder.

The milled PS-powder was blended with LMO to form a 5 wt % PS-powder bulk blend that was used to produce several thickness sintered pellets as explained below.

The 1 mm LMO/5% PS-powder sample was prepared by adding 0.75 gram of the bulk PS-powder blend into a mortar and 35 microliter water was added to the LMO/PS-powder blend and mixed with a pestle for about 2 minutes to form a paste like substance. Half of the mixture (~0.39 gram) was added to the stainless steel die and a metal pellet was separating the second half of the mixture in the die, creating 2 samples in one process. The samples were pressed for 20 minutes at 100° C. with a pressure of 300 MPa and then cooled under pressure for 20 minutes.

The 2 mm LMO/5% PS-powder sample was prepared by adding 1.5 gram of the bulk PS-powder blend into a mortar and 71 microliter water was added to the LMO/PS-powder blend and mixed with a pestle for about 2 minutes to form a paste like substance. Half of the mixture (~0.79 gram) was added to the stainless steel die and a metal pellet was separating the second half of the mixture in the die, creating 2 samples in one process. The samples were pressed for 20 minutes at 100° C. with a pressure of 300 MPa and then cooled down under pressure for 20 minutes.

The 5.5 mm LMO/5% PS-powder sample was prepared by adding 2.10 gram bulk PS-powder blend into a mortar and 100 microliter water was added to the LMO/PS-powder blend and mixed with a pestle for about 2 minutes to form a paste like substance. The mixture was added to the stainless steel die and the sample is pressed for 20 minutes at 100° C. with a pressure of 300 MPa and then cooled under pressure for 20 minutes. Properties of each pellet are presented in Table 5 below.

TABLE 5

LMO/polystyrene polymer powder composites sintering properties

| Desired Thickness (mm) | Measured Thickness (mm) | Polymer level (wt %) | Mw (g/mol) | Mn (g/mol) | Density (g/cc) | Relative Density (%) |
|---|---|---|---|---|---|---|
| 1.0 | 1.15 ± 0.06 | NA | NA | NA | 2.625 ± 0.028 | NA |
| 2.0 | 2.20 ± 0.14 | 5.20 ± 0.10 | 19100 ± 169 | 4939 ± 33 | 2.613 ± 0.068 | 96.0 ± 1.2 |
| 5.5 | 5.63 ± 0.04 | 5.57 ± 0.28 | 19297 ± 205 | 4947 ± 47 | 2.670 ± 0.005 | 97.2 ± 0.4 |
| Average | | 5.45 ± 0.29 | 19199 ± 200 | 4943 ± 36 | 2.638 ± 0.050 | 96.8 ± 0.9 |

Experimental Example 3: LMO/(Poly)Butyl Acrylate Composites Via Reactive Cold-Sintering The purpose of this example was to demonstrate the preparation of LMO pellets containing up to ~6 wt % (poly)butyl acrylate through in-situ reactive cold sintering.

Milled LMO powder (2.0 g) was added to a mortar, to which a 5 or 10 wt % mixture of butyl acrylate containing 1 wt % azobisisobutyronitrile (AIBN) and 100 μL of de-ionized water was added. The resultant mixture was then ground to a paste-like consistency using a pestle. The paste containing either 5 or 10 wt % butyl acrylate was then transferred to a stainless steel die at room temperature and heated at a constant temperature of 100° C. for 10 min. Densification and further polymerization was achieved by pressing the heated mixture at 100° C. for 20 min at a pressure of 300 MPa, followed by a 30 min dwell-step at the same temperature. The final densified pellet was removed from the die upon cooling. The organic content of the polymerized pellet was determined by thermogravimetric analysis in air, allowing for determination of relative density as summarized in Table 6 below [(poly)butyl acrylate p=1.070 g/cc].

TABLE 6

LMO/(poly)butyl acrylate reactive composites sintering properties

| Butyl acrylate (wt % w.r.t. LMO) | Organic content (wt %) | Density (g/cc) | Relative Density (%) | Polymer Mw |
|---|---|---|---|---|
| 5 | 1.00 | 2.882 | 96.9 | 36,480 |
| 10 | 5.85 | 2.647 | 97.1 | 273,400 |

Experimental Example 4: LMO/EPA (Cyclic Acetylene Polymer) Composites Via Reactive Cold-Sintering This example demonstrates the preparation of LMO pellets containing up to 20 wt % of a polymer of 4-ethynylphthalic anhydride (EPA), having a measured density of 1.380 g/cc, through in-situ reactive cold sintering.

10 or 20 wt % EPA powder was mixed with 2.0 g of milled LMO powder using a mortar and pestle. To the mixture, 100 μL of water was added and the mixture was thoroughly ground before transferring to a stainless steel die. The mixture was first compacted under a pressure of 75 MPa, and then subjected to a heat step at a temperature of 140° C. for 20 min under ambient pressure.

The compacted mixture was then cold-sintered at a pressure of 300 MPa for 20 min at the same temperature to achieve densification. To enable further polymerization of the EPA monomer, the composite was thermally treated at 1 h under ambient pressure at 140° C. before cooling and part ejection. The organic content of the polymerized pellet was measured by thermogravimetric analysis in air, allowing for determination of relative density as summarized in Table 7 below [EPA polymer ρ=1.380 g/cc].

TABLE 7

LMO/EPA reactive polymer composites sintering properties

| EPA (wt % w.r.t. LMO) | Organic content (wt %) | Density (g/cc) | Relative Density (%) |
|---|---|---|---|
| 10 | 9.70 | 2.520 | 92.83 |
| 20 | 20.30 | 2.326 | 95.40 |

NMR and IR analysis. NMR Spectroscopy: $^1$H NMR and $^{13}$C NMR spectra were measured on Bruker Advance Ultra Shielded NMR equipment operating at 400 MHz and 100 MHz, respectively, using DMSO-d6 or Acetone-d$_6$ as solvent as stated. Infrared Spectroscopy: FT-infrared spectra were recorded on Perkin Elmer Spectrum equipped with a Specac Golden Gate diamond ATR and the compounds were measured as solids.

EPA was heated in air using a heating block for 1, 3 or 20 h at 140° C. Samples for analysis were directly taken from the molten reaction.

Results. The $^1$H NMR spectrum in acetone-d$_6$ showed that upon subjecting EPA to a heat treatment the signals become broader. A CCH signal around 4 ppm decreased in intensity indicating a reaction of the CC triple bond. In the aromatic region, an increase in signals was observed as well as a broadening due to insoluble material. The broadening is also observed in the $^1$H NMR spectrum in DMSO-d$_6$ indicating the presence of insoluble, polymer material.

IR spectra showed that CCH vibrations at ~2200 and 3300 cm$^{-1}$ reduced significantly in intensity upon subjecting EPA to 140° C., confirming the NMR data that the EPA molecule is undergoing a reaction.

Experimental Example 5: LMO/Polyester Composites Via Reactive Cold-Sintering

In general, three thickness samples, 1 mm, 2 mm and 5.5 mm ceramic composite pellets, were manufactured by reactive cold sintering to form a LMO/polyester composite sintered ceramic pellet. The polyester was a reaction product of the monomers bisphenol A diglycidyl ether (BADGE) and 1,10 decanedicarboxylic acid (DDDA) in a 1:2 mole ratio that formed a cross-linked thermoset polymer. The BADGE/DDDA polyester has a measured density of 1.138 g/cc.

A blend of the monomers in a 1:2 mole ratio was prepared by melt mixing BADGE (3.00 g) and DDDA (8.87 g) for 7 minutes at 200° C., such that the monomers do not react, but form a water like clear blend. Then the monomer mix was poured into an alumina cup to solidify for use in ceramic cold sintering.

The solidified monomer mix was blended with milled-LMO to form a 10 wt % monomer-powder bulk blend that was used to produce several thickness cold sintered LMO/polyester composite ceramic pellets via the in-situ reactive sintering approach.

The 1 mm LMO/10% Polyester in-situ sample was prepared by adding 0.39 gram of the bulk LMO/monomer blend into a mortar and 18 microliter water was added to the LMO/Polyester monomer blend and mixed with a pestle for about 2 minutes to form a paste like substance and transferred to the stainless steel die. The sample was pressed for 40 minutes at 200° C. with a pressure of 300 MPa and then cooled under pressure for 40 minutes.

The 2 mm LMO/10% Polyester in-situ sample was prepared by adding 0.77 gram of the bulk LMO/monomer blend into a mortar and 35 microliter water was added to the LMO/Polyester monomer blend and mixed with a pestle for about 2 minutes to form a paste like substance and transferred to the stainless steel die. The sample was pressed for 40 minutes at 200° C. with a pressure of 300 MPa and then cooled under pressure for 40 minutes.

The 5.5 mm LMO/10% Polyester in-situ sample was prepared by adding 2.0 gram of the bulk LMO/monomer blend into a mortar and 90 microliter water was added to the LMO/Polyester monomer blend and mixed with a pestle for about 2 minutes to form a paste like substance and transferred to the stainless steel die. The sample was pressed for 40 minutes at 200° C. with a pressure of 300 MPa and then cooled down under pressure for 40 minutes. Properties of the pellets are summarized in Table 8 below.

TABLE 8

LMO/polyester (BADGE/DDDA) reactive composites sintering properties

| Desired Thickness (mm) | Measured Thickness (mm) | Monomer addition (wt %) | Polymer level (wt %) | Density (g/cc) | Relative Density (%) |
|---|---|---|---|---|---|
| 1.0 | 1.05 ± 0.03 | 10 | NA | 2.536 ± 0.047 | NA |
| 2.0 | 2.01 ± 0.07 | 10 | 8.94 ± 0.37 | 2.528 ± 0.014 | 96.4 ± 0.6 |
| 5.5 | 5.42 ± 0.36 | 10 | 9.85 ± 0.58 | 2.530 ± 0.053 | 97.2 ± 1.3 |
| Average | — | — | 9.54 ± 0.77 | 2.531 ± 0.042 | 96.9 ± 1.1 |

Comparative Example 4: LMO/Polyester Powder Composites Cold Sintering

The polyester used in Example 5 is not commercially available and therefore it was made in house. This was done by adding 3.00 gram bisphenol A diglycidyl ether (BADGE) and 8.87 gram 1,10 decanedicarboxylic acid (DDDA), equal to 1:2 mole ratio, in a 20 ml sample vial and heating the mixture to 200° C. for 1.5 hour after which the two monomers reacted to form a cross-linked rubber like polyester polymer. The polymer was retrieved from the glass sample vial and ground using a Retzsch ZM200 mill with a 0.5 mm sieve.

The milled-Polyester was blended with milled-LMO to form a 10 wt % Polyester-powder bulk blend that was used to produce several thickness cold sintered LMO/polyester composite ceramic pellets.

The 1 mm LMO/10% Polyester-powder sample was prepared by adding 0.77 gram of the bulk Polyester-powder blend into a mortar and 35 microliter water was added to the LMO/Polyester-powder blend and mixed with a pestle for about 2 minutes to form a paste like substance. Half of the mixture (~0.40 gram) was added to the stainless steel die and a metal pellet was separating the second half of the mixture in the die, creating 2 samples in one process. The samples were pressed for 20 minutes at 200° C. with a pressure of 300 MPa and then cooled under pressure for 40 minutes.

The 2 mm LMO/10% Polyester-powder sample was prepared by adding 1.54 gram of the bulk Polyester-powder blend into a mortar and 69 microliter water was added to the LMO/Polyester-powder blend and mixed with a pestle for about 2 minutes to form a paste like substance. Half of the mixture (~0.80 gram) was added to the stainless steel die and a metal pellet was separating the second half of the mixture in the die, creating 2 samples in one process. The samples were pressed for 20 minutes at 200° C. with a pressure of 300 MPa and then cooled under pressure for 40 minutes.

The 5.5 mm LMO/10% Polyester-powder sample was prepared by adding 2.10 gram bulk Polyester-powder blend into a mortar and 95 microliter water was added to the LMO/Polyester-powder blend and mixed with a pestle for about 2 minutes to form a paste like substance. The mixture was added to the stainless steel die and the sample was pressed for 20 minutes at 200° C. with a pressure of 300 MPa and then cooled under pressure for 40 minutes. Table 9 summarized properties of the pellets.

TABLE 9

LMO/polyester polymer powder composites sintering properties

| Desired Thickness (mm) | Measured Thickness (mm) | Polymer addition (wt %) | Polymer level (wt %) | Density (g/cc) | Relative Density (%) |
|---|---|---|---|---|---|
| 1.0 | 1.05 ± 0.05 | 10 | NA | 2.647 ± 0.025 | NA |
| 2.0 | 2.08 ± 0.04 | 10 | 9.48 ± 0.78 | 2.598 ± 0.013 | 99.3 ± 1.1 |
| 5.5 | 5.66 ± 0.06 | 10 | 9.85 ± 0.58 | 2.596 ± 0.006 | 99.7 ± 1.0 |
| Average | — | — | 9.73 ± 0.63 | 2.610 ± 0.026 | 99.6 ± 1.0 |

Example 6: Zinc Oxide (ZnO)/Polyester Composites Via Reactive Cold-Sintering

A blend of monomers bisphenol A diglycidyl ether (BADGE) and 1,10 decanedicarboxylic acid (DDDA) were prepared as in Example 5 above.

ZnO powder (3.0 g) was added to a mortar, wherein 0.33 gram polyester monomer blend (9.9 wt %) was added. The resultant mixture was ground to form a homogeneous mixture using a pestle. To this ZnO/polyester monomer mixture 300 microliter 0.9M Zinc Acetate solution was added and mixed using a pestle. The resulting paste containing 9.9 wt % polyester monomer was then transferred to a stainless steel die at room temperature, pressurized at 375 MPa, and heated to a constant temperature of 120° C. for 75 minutes to sinter the ZnO. At this temperature no polymerization occurred, so the sample was heated to 200° C. for 60 minutes to polymerize the polyester monomers to form a cross-linked polyester polymer. The sample was cooled for 30 minutes in air and removed from the die. Properties of the sample are summarized in Table 10 below.

TABLE 10

ZnO/polyester (BADGE/DDDA) powder composites sintering properties

| Monomer addition (wt %) | Polymer content (wt %) | Density (g/cc) | Relative Density (%) |
|---|---|---|---|
| 9.96 | 8.97 | 3.899 | 94.0 |

Example 7: Sodium Chloride (NaCl)/Polyester Composites Via Reactive Cold-Sintering A blend of monomers bisphenol A diglycidyl ether (BADGE) and 1,10 decanedicarboxylic acid (DDDA) was prepared as in Example 5 above.

Milled-NaCl powder (2.5 g) was added to a mortar, to which 0.28 gram polyester monomer blend (10.0 wt %) was added. The resultant mixture was ground to form a homogeneous mixture using a pestle. To this milled-NaCl/polyester monomer mixture 250 microliter water was added and mixed using a pestle. The resulting paste containing 10.8 wt % polyester monomer was transferred to a stainless steel die at room temperature, pressurized at 375 MPa at room temperature for 15 minutes to sinter the NaCl. At this temperature no polymerization occurred, so the sample was heated to 200° C. for 120 minutes to polymerize the polyester monomers to form a cross-linked polyester polymer. The sample was cooled for 30 minutes in air and removed from the die. Properties of the sample are presented in Table 11 below.

TABLE 11

NaCl/polyester (BADGE/DDDA) reactive composites sintering properties

| Monomer addition (wt %) | Polymer content (wt %) | Density (g/cc) | Relative Density (%) |
|---|---|---|---|
| 10.79 | 1.82 | 2.130 | 97.8 |

Example 8: LMO/Polycaprolactone Composites Via Reactive Cold-Sintering

LMO pellets containing about 3 wt % polycaprolactone were prepared through in-situ reactive cold sintering.

Milled-LMO powder (1.60 g) of was added to a mortar and 80 microliter water was added and ground with a pestle to form a paste like mixture. To the paste like mixture 0.4 gram (20 wt %) ε-caprolactone containing 1 wt % zinc acetylacetonate catalyst was added. The resultant mixture was then mixed using a pestle to form a monomer/ceramic paste.

The monomer/ceramic paste containing 20 wt % ε-caprolactone was transferred to a stainless steel die at room temperature and heated to a constant temperature of 200° C. for 80 minutes to pre-polymerize the caprolactone. Densification and further polymerization was achieved by pressing the heated mixture at 200° C. for 10 min at a pressure of 225 MPa. The final densified pellet was removed from the die upon cooling. The organic content of the polymerized pellet was determined by thermogravimetric analysis in air, allowing for determination of relative density as summarized in Table 12-A below [polycaprolactone $\rho=1.145$ g/cc].

TABLE 12-A

LMO/polycaprolactone reactive composites sintering properties

| Caprolactone (wt %) | Polymer content (wt %) | Density (g/cc) | Relative Density (%) | Polymer Mw | Polymer Mn |
|---|---|---|---|---|---|
| 20 | 3.1 | 2.623 | 91.0 | 1701 | 599 |

Comparative Example 5: LMO/(Poly)Butyl Acrylate Polymer Composites Cold Sintering LMO pellets containing up to ~2.8 wt % (poly)butyl acrylate were prepared through the polymer addition method.

The (poly)butyl acrylate was prepared in house by polymerizing butyl acrylate, containing 1 wt % azobisisobutyronitrile (AIBN) initiator, at 100° C. for 30 minutes and subsequently at 150° C. for 30 minutes. The resulting (poly)butyl acrylate, with a Mw of 67948 g/mol (vs. PS standard) and a Mn of 3551 (vs. PS standard), was used as produced for ceramic/polymer composite cold sintering.

A cold sintered LMO/(poly)butyl acrylate composite pellet was made by adding 1.9 gram of milled LMO powder and 95 μL of de-ionized water. The resultant mixture was then ground to a paste-like consistency using a pestle. To this paste like substance 5 wt % of (poly)butyl acrylate made as described above was added and ground once more to form a sticky paste like substance.

The paste containing 5 wt % (poly)butyl acrylate was then transferred to a stainless steel die at room temperature and heated at a constant temperature of 100° C. while pressing for 20 min at a pressure of 300 MPa. The final densified pellet was removed from the die upon cooling.

The organic content of the polymerized pellet was determined by thermogravimetric analysis in air, allowing for determination of relative density [(poly)butyl acrylate $\rho=1.070$ g/cc].

TABLE 12-B

LMO/(poly)butyl acrylate polymer composite sintering properties

| Polymer addition (wt %) | Polymer level (wt %) | Density (g/cc) | Relative Density (%) |
|---|---|---|---|
| 5 | 2.79 | 2.785 | 96.6 |

Experimental Example 9: Diametral Compression

In the diametral compression test method, circular disks of 5 mm to 6 mm thickness were prepared according Comparative Example 2 (LMO), Experimental Example 2 (LMO PS in-situ), Comparative Example 3 (LMO PS powder), Experimental Example 5 (LMO polyester in-situ), and Comparative Example 4 (LMO polyester powder) above was compressed along its diameter by two flat metal plates. The compression along the diameter created a maximum tensile stress perpendicular to the loading direction in the mid-plane of the specimen (see J. J. Swab et al., *Int. J. Fract.* (2011) 172: 187-192). The fracture strength ($\sigma_f$) of the ceramic can be calculated by the following equation:

$$\sigma_f = \frac{2P}{\pi Dt}$$

where P is the fracture load, D is the disk diameter and t is the disk thickness.

All tests were conducted on an ElectroPlus™ E3000 All-electric dynamic test instrument (Instron) with a 1000 N load cell at room temperature. The specimen disks were mounted between two flat metal plates and a small pre-load of 5 N was applied. Diametral compression tests were conducted under displacement control (0.5 mm/min), and time, compressive displacement and load data was captured at 250 Hz.

Prior to testing, all specimen disks were speckled using black spray paint. During diametral compression, sequential images of the speckled surface were captured with INSTRON video extensometer AVE (Fujinon 35 mm) at a frequency of 50 Hz. Post-test, all images were analyzed using the DIC replay software (Instron) to generate full-field strain maps. A virtual strain gage (6 mm×3 mm) was inserted in the mid-plane of each specimen and transverse strain ($\varepsilon_x$) was calculated. The fracture strain ($\varepsilon_f$) was calculated at the maximum load. Table 13 below compares fracture strength and fracture strain of the tested samples.

TABLE 13

Strength of reactive cold sintered composites compared to neat LMO and their polymer powder equivalents

| Sample | $\sigma_f$ (MPa) | % Change vs LMO | $\varepsilon_f$ (%) | % Change vs LMO | Modulus of Toughness (MPa) | % Change vs LMO |
|---|---|---|---|---|---|---|
| LMO | 2.97 ± 0.36 | | 0.05 ± 0.05 | | 0.10 ± 0.17 | |
| LMO PS in-situ | 3.84 ± 1.1 | +30 | 0.04 ± 0.02 | −20 | 0.07 ± 0.06 | −30 |
| LMO PS Powder | 6.56 ± 0.27 | +120 | 0.06 ± 0.01 | +20 | 0.22 ± 0.05 | 171 |
| LMO Polyester in-situ | 6.55 ± 1.21 | +120 | 0.18 ± 0.04 | +260 | 0.82 ± 0.29 | 327 |
| LMO Polyester Powder | 7.44 ± 0.45 | +150 | 0.08 ± 0.01 | +60 | 0.35 ± 0.04 | 30 |

Experimental Example 10: Apparent Fracture Toughness ($K_I$)

Fracture toughness is a measure of a materials resistance to catastrophic crack propagation in presence of a sharp defect and is measured by the critical stress intensity factor ($K_C$). Standard methods for measurement of fracture toughness involve preparation of the test sample in compact tension (CT) or single edge notch beam (SENB) geometry and initiating a sharp crack of known length. Specimens prepared as in Example 9, but with this additional geometry, were then loaded under mode I opening load to catastrophically propagate the crack. The disk-shaped compact tension DCT specimen as defined in ASTM E399, was used for the measurement of crack-growth resistance in the tested ceramic and ceramic polymer composites. The mode I linear-elastic stress intensity ($K_I$) solution for this geometry is defined as (Newman, J C Jr. Stress intensity factors and crack opening displacements for round compact specimens. *International Journal of Fracture*, 1981; 17(6): 567-578):

$$K_I = \frac{P}{B\sqrt{W}} f\left(\frac{a}{W}\right)$$

$$f\left(\frac{a}{W}\right) = \frac{2 + \frac{a}{W}}{\left(1 - \frac{a}{W}\right)^{3/2}} \left[0.76 + 4.8\left(\frac{a}{W}\right) - 11.58\left(\frac{a}{W}\right)^2 + 11.43\left(\frac{a}{W}\right)^3 - 4.08\left(\frac{a}{W}\right)^4\right]$$

where P is the applied load, and a, B and W are the crack length, thickness and width of the specimen, respectively.

In order to prepare the DCT geometry, cylindrical specimens (diameter=13 mm; thickness=5 to 6 mm) were mounted in special holders and milled on a CNC milling machine (Roland MDX 540) into compact tension geometry. A notch tip root radius of 0.4 mm was milled. Due to the difficulty on preparing sharp notches and the defect sensitivity of ceramics, all fracture testing was performed on blunt notch (0.4 mm radius) DCT specimens and a comparison of the apparent fracture toughness ($K_I$) was made. The DCT specimens were mounted on a Zwick Z2.5 (Zwick/Roell) with a 2.5 kN load cell. The specimens were mounted on the test machine with the help of mounting pins and loaded under displacement control (0.5 mm/min) until fracture. Table 14 below summarizes results of the tests.

TABLE 14

Apparent fracture toughness of reactive cold sintered composites compared to neat LMO and their polymer powder equivalents.

| | KI (MPa√m) | % Change vs LMO |
|---|---|---|
| LMO | 10.2 | |
| LMO PS in-situ | 8.5 | −16 |
| LMO PS Powder | 10.1 | −1 |
| LMO Polyester in-situ | 12.0 | +18 |
| LMO Polyester Powder | 11.2 | +10 |

Experimental Example 11: Thermal Conductivity of Reactive Cold Sintered Composites Compared to Neat LMO and their Polymer Powder Equivalents Samples prepared as in Experimental Example 9 were subjected to thermal conductivity tests utilizing a Retsch 447 Laser Flash Analysis (LFA) equipment in accordance with standards ASTM E1461, DIN EN 821, DIN 30905, and ISO 22007-4:2008. For each sample, thermal diffusivity (a; mm²/s) was measured by LFA, specific heat ($c_p$; J/g/K) was measured by differential scanning calorimetry, and density ($\rho$; g/cm³) was measured by the Archimedes method to calculate thermal conductivity ($\lambda$; W/m*K) according to the equation:

$$\lambda(T) = \alpha(T) \cdot c_p(T) \cdot \rho(T)$$

Table 15 below summarizes the results of the tests. Both polystyrene samples show little thermal conductivity difference compared to neat LMO. Both polyester samples show a significant decrease in thermal conductivity. The in-situ polymerized polyester has an even lower thermal conductivity0 compared to the polyester powder.

TABLE 15

Thermal properties of reactive cold sintered composites
compared to neat LMO and their polymer powder equivalents

| Sample | Thermal diffusivity (mm2/s) | % change vs. LMO | Specific heat (J/g/K) | % change vs. LMO | Thermal conductivity (W/(m*K) | % change vs. LMO |
|---|---|---|---|---|---|---|
| LMO | 0.852 ± 0.053 | — | 0.892 ± 0.009 | – | 2.10 ± 0.22 | — |
| LMO/PS in-situ | 0.912 ± 0.082 | 7.1 | 0.839 ± 0.029 | −5.9 | 2.04 ± 0.17 | −3.2 |
| LMO/PS powder | 0.940 ± 0.039 | 10.4 | 0.845 ± 0.007 | −5.2 | 2.19 ± 0.14 | 3.9 |
| LMO/polyester in-situ | 0.612 ± 0.045 | −28.1 | 0.945 ± 0.045 | 6.0 | 1.39 ± 0.15 | −33.8 |
| LMO/polyester powder | 0.757 ± 0.020 | −11.1 | 0.879 ± 0.027 | −1.4 | 1.78 ± 0.10 | −15.3 |

Further Examples

Additional examples listed below further illustrate the processes and the cold-sintered ceramic polymer composites of the invention.

Example 1 is a process for making a cold-sintered ceramic polymer composite, comprising
   a. combining at least one inorganic compound in the form of particles having a number average particle size of less than about 30 μm with at least one monomer, reactive oligomer, or combination thereof and a solvent in which the inorganic compound is at least partially soluble to obtain a mixture;
   b. subjecting the mixture to polymerization conditions to obtain a pre-ceramic polymer mixture comprising a polymer of the at least one monomer, reactive oligomer, or combination thereof, the particulate inorganic compound, and the solvent; and
   c. exposing the pre-ceramic polymer mixture to a pressure of no more than about 5000 MPa and a temperature of less than about 200° C. above the boiling point of the solvent to obtain the cold-sintered ceramic polymer composite.

Example 2 is a process for making a cold-sintered ceramic polymer composite, comprising
   a. combining at least one inorganic compound in the form of particles having a number average particle size of less than about 30 μm with a solvent in which the inorganic compound is at least partially soluble to obtain a mixture;
   b. subjecting the mixture to a pressure of no more than about 5000 MPa and a temperature of less than 200° C. above the boiling point of the solvent to obtain a cold-sintered ceramic;
   c. infusing the cold-sintered ceramic with at least one monomer, reactive oligomer, or combination thereof to obtain a cold-sintered ceramic pre-polymer mixture comprising the cold-sintered ceramic and the at least one monomer, reactive oligomer, or combination thereof to be polymerized into a polymer; and
   d. subjecting the cold-sintered ceramic pre-polymer mixture to polymerization conditions to obtain the cold-sintered ceramic polymer composite.

Example 3 is a process for making a cold-sintered ceramic polymer composite, comprising
   a. combining at least one inorganic compound in the form of particles having a number average particle size of less than about 30 μm with at least one monomer, reactive oligomer, or combination thereof and a solvent in which the inorganic compound is at least partially soluble to obtain a mixture;
   b. subjecting the mixture to a pressure of no more than about 5000 MPa and a temperature of less than 200° C. above the boiling point of the solvent to obtain a cold-sintered ceramic pre-polymer mixture comprising a cold-sintered ceramic and at least one monomer, reactive oligomer, or combination thereof to be polymerized into a polymer; and
   c. subjecting the cold-sintered ceramic pre-polymer mixture to polymerization conditions and form the cold-sintered ceramic polymer composite.

Example 4 is a process for making a cold-sintered ceramic polymer composite comprising
   combining at least one inorganic compound in the form of particles having a number average particle size of less than about 30 μm with at least one monomer, reactive oligomer, or combination thereof and a solvent in which the inorganic compound is at least partially soluble to obtain a mixture; and
   subjecting the mixture to a pressure of no more than about 5000 MPa and a temperature of less than 200° C. above the boiling point of the solvent, whereby the at least one monomer, reactive oligomer, or combination undergo polymerization into a polymer, to obtain the cold-sintered ceramic polymer composite.

Example 5-A includes any one of examples 1-4, wherein the weight percentage of the inorganic compound in the mixture is about 50 to about 95% (w/w) based upon the total weight of the mixture.

Example 5-B includes any one of examples 1-4, wherein the weight percentage of the inorganic compound in the mixture is about 50 to about 99.5% (w/w) based upon the total weight of the mixture.

Example 6 includes any one of examples 1-5, wherein the weight percentage of the at least one monomer, reactive oligomer, or combination thereof in the mixture is about 5 to about 50% (w/w) based upon the total weight of the mixture, respectively.

Example 7 includes any one of examples 1-6, wherein the solvent comprises water, an alcohol, an ester, a ketone, dipolar aprotic solvent, or combinations thereof.

Example 8 includes example 7, wherein the solvent further comprises an inorganic acid, an organic acid, an inorganic base, or organic base.

Example 9 includes any one of examples 1-8, wherein the process further comprises subjecting the cold-sintered ceramic polymer composite to a post-curing or finishing step.

Example 10 includes any one of examples 1-9, wherein the polymerization is a condensation polymerization, a ring-opening polymerization, a radical polymerization, or a thermal polymerization.

Example 11 includes any one of examples 1-10, wherein the polymer is at least one selected from the group consisting of a polyimide, a polyamide, a polyester, a polyurethane, a polysulfone, a polyketone, a polyformal, a polycarbonate, a polyether.

Example 12 includes any one of examples 1-11, wherein, the monomer or reactive oligomer is at least one selected from the group consisting of an epoxide, a cyclic phosphazene, a cyclic phosphite, a cyclic phosphonate, a cyclic organosiloxane, a lactam, a lactone, a cyclic carbonate oligomer, and a cyclic ester oligomer.

Example 13 includes any one of examples 1-11, wherein the monomer or reactive oligomer is at least one selected from the group consisting of styrene, a styrene derivative, 4-vinylpryrolidine, an N-vinylpryrolidone, an acrylonitrile, a vinylacetate, an alkylolefin, a vinylether, a vinylacetate, a cyclic olefin, a maleimide, a cycloaliphatic, an alkene, and an alkyne.

Example 14 includes any one of examples 1-13, wherein the polymer is at least one selected from the group consisting of a branched polymer, a polymer blend, a copolymer, a random copolymer, a block copolymer, a cross-linked polymer, a blend of a cross-linked polymer with a non-cross-linked polymer, a macrocycle, a supramolecular structure, a polymeric ionomer, a dynamic cross-linked polymer, and a sol-gel.

Example 15 includes any one of examples 1-14, wherein the mixture further comprises one or more of a polymerization catalyst promoter, a polymerization catalyst inhibitor, a polymerization co-catalyst, a photo initiator in combination with a light source, a phase transfer catalyst, and a chain transfer agent.

Example 16 includes example 15, wherein the polymerization catalyst, polymerization catalyst promoter, polymerization catalyst inhibitor, photo initiator, or polymerization co-catalyst is dissolved or suspended in the solvent.

Example 17 includes example 15 or 16, wherein the polymerization catalyst is coated on at least a portion of the inorganic compound particles.

Example 18 includes any one of examples 1-4, wherein the inorganic compound or the cold-sintered ceramic is a polymerization catalyst.

Example 19 includes any one of examples 15-18, wherein the polymerization catalyst is an encapsulated catalyst.

Example 20 includes any one of examples 1-19, wherein the process further includes one or more steps selected from injection molding, autoclaving, and calendering.

Example 21 includes example 2, wherein the infusing is injecting the at least one monomer, reactive oligomer, or combination thereof in the liquid state into the cold-sintered ceramic.

Example 22 includes example 2, wherein the infusing is injecting a solution or a suspension comprising the at least one monomer, reactive oligomer, or combination thereof and an infusing solvent into the cold-sintered ceramic.

Example 23 includes any one of examples 1-22 wherein the cold-sintered ceramic polymer composite has a relative density of at least 90%.

Example 24 includes any one of examples 1-23 wherein the cold-sintered ceramic polymer composite has a relative density of at least 95%.

Example 25 is a cold-sintered ceramic polymer composite that is produced by the process according to any one of examples 1-24.

We claim:

1. A process for making a cold-sintered ceramic polymer composite, comprising
   a. combining at least one inorganic compound in the form of particles having a number average particle size of less than about 30 μm with at least one monomer, reactive oligomer, or combination thereof and a solvent in which the inorganic compound is at least partially soluble to obtain a mixture;
   b. subjecting the mixture to polymerization conditions to obtain a pre-ceramic polymer mixture comprising a polymer of the at least one monomer, reactive oligomer, or combination thereof, the particulate inorganic compound, and the solvent; and
   c. exposing the pre-ceramic polymer mixture to a pressure of no more than about 5000 MPa and a temperature of less than about 200° C. above the boiling point of the solvent to obtain the cold-sintered ceramic polymer composite.

2. A process for making a cold-sintered ceramic polymer composite, comprising
   a. combining at least one inorganic compound in the form of particles having a number average particle size of less than about 30 μm with a solvent in which the inorganic compound is at least partially soluble to obtain a mixture;
   b. subjecting the mixture to a pressure of no more than about 5000 MPa and a temperature of less than 200° C. above the boiling point of the solvent to obtain a cold-sintered ceramic;
   c. infusing the cold-sintered ceramic with at least one monomer, reactive oligomer, or combination thereof to obtain a cold-sintered ceramic pre-polymer mixture comprising the cold-sintered ceramic and the at least one monomer, reactive oligomer, or combination thereof to be polymerized into a polymer; and
   d. subjecting the cold-sintered ceramic pre-polymer mixture to polymerization conditions to obtain the cold-sintered ceramic polymer composite.

3. A process for making a cold-sintered ceramic polymer composite comprising
   a. combining at least one inorganic compound in the form of particles having a number average particle size of less than about 30 μm with at least one monomer, reactive oligomer, or combination thereof and a solvent in which the inorganic compound is at least partially soluble to obtain a mixture; and
   b. subjecting the mixture to a pressure of no more than about 5000 MPa and a temperature of less than 200° C. above the boiling point of the solvent, whereby the at least one monomer, reactive oligomer, or combination undergo polymerization into a polymer, to obtain the cold-sintered ceramic polymer composite.

4. The process according to claim 1, wherein the weight percentage of the inorganic compound in the mixture is about 50 to about 99.5% (w/w) based upon the total weight of the mixture.

5. The process according to claim 1, wherein the weight percentage of the at least one monomer, reactive oligomer, or combination thereof in the mixture is about 0.5 to about 25% (w/w) based upon the total weight of the mixture, respectively.

6. The process according to claim 1, wherein the solvent comprises water, an alcohol, an ester, a ketone, dipolar aprotic solvent, or combinations thereof.

7. The process according to claim 6, wherein the solvent further comprises an inorganic acid, an organic acid, an inorganic base, a water-soluble metal salt, or organic base.

8. The process according to claim 1, wherein the process further comprises subjecting the cold-sintered ceramic polymer composite to a post-curing or finishing step.

9. The process according to claim 1, wherein the polymerization is a condensation polymerization, a ring-opening polymerization, a radical polymerization, or a thermal polymerization.

10. The process according to claim 1, wherein the polymer is at least one selected from the group consisting of a polyimide, a polyamide, a polyester, a polyurethane, a polysulfone, a polyketone, a polyformal, a polycarbonate and a polyether.

11. The process according to claim 1, wherein, the monomer or reactive oligomer is at least one selected from the group consisting of an epoxide, a cyclic phosphazene, a cyclic phosphite, a cyclic phosphonate, a cyclic organosiloxane, a lactam, a lactone, a cyclic carbonate oligomer, and a cyclic ester oligomer.

12. The process according to claim 1, wherein the monomer or reactive oligomer is at least one selected from the group consisting of styrene, a styrene derivative, 4-vinylpyridine, an N-vinylpryrolidone, an acrylonitrile, a vinylacetate, an alkylolefin, a vinylether, a vinylacetate, a cyclic olefin, a maleimide, a cycloaliphatic, an alkene, and an alkyne.

13. The process according to claim 1, wherein the polymer is at least one selected from the group consisting of a branched polymer, a polymer blend, a copolymer, a random copolymer, a block copolymer, a cross-linked polymer, a blend of a cross-linked polymer with a non-crosslinked polymer, a supramolecular structure, a polymeric ionomer, a dynamic cross-linked polymer, and a sol-gel.

14. The process according to claim 1, wherein the mixture further comprises one or more of a polymerization catalyst promoter, a polymerization catalyst inhibitor, a polymerization co-catalyst, a photo initiator in combination with a light source, a phase transfer catalyst, and a chain transfer agent.

15. The process according to claim 14, wherein the polymerization catalyst, polymerization catalyst promoter, polymerization catalyst inhibitor, photo initiator, or polymerization co-catalyst is dissolved or suspended in the solvent.

16. The process according to any one of claim 14 or 15, wherein the polymerization catalyst is coated on at least a portion of the inorganic compound particles.

17. The process according to claim 1, wherein the inorganic compound or the cold-sintered ceramic is a polymerization catalyst.

18. The process according to claim 14, wherein the polymerization catalyst is an encapsulated catalyst.

19. The process according to claim 1, wherein the process further includes one or more steps selected from injection molding, autoclaving, and calendering.

* * * * *